United States Patent
Craft

[19]

[11] Patent Number: 6,026,453
[45] Date of Patent: Feb. 15, 2000

[54] SYSTEM FOR FACILITATING SERIAL DATA COMMUNICATIONS UTILIZING NUMBER OF CYCLES INPUT SIGNAL REMAINED ASSERTED TO INDICATE DATA OUTPUT LOGICAL STATE

[75] Inventor: David John Craft, Austin, Tex.

[73] Assignee: International Business Machines Corporation, Armonk, N.Y.

[21] Appl. No.: 08/892,720

[22] Filed: Jul. 15, 1997

[51] Int. Cl.[7] .............................. G06F 13/14; G06F 13/20
[52] U.S. Cl. ................................ 710/62; 710/53; 710/63; 371/67.1
[58] Field of Search ...................................... 395/821, 882, 395/873, 883, 872; 371/67.1; 710/1, 62, 53, 63, 52

[56] References Cited

U.S. PATENT DOCUMENTS

| | | | |
|---|---|---|---|
| 4,434,474 | 2/1984 | Best et al. | 364/900 |
| 4,628,480 | 12/1986 | Floyd | 364/900 |
| 5,199,107 | 3/1993 | Ozawa | 395/325 |
| 5,404,459 | 4/1995 | Gulick et al. | 395/275 |
| 5,414,721 | 5/1995 | Fukui | 371/67.1 |
| 5,440,694 | 8/1995 | Nakajima | 395/873 |
| 5,524,237 | 6/1996 | Bestler et al. | 395/550 |
| 5,555,383 | 9/1996 | Elazar et al. | 395/306 |
| 5,564,114 | 10/1996 | Popat et al. | 395/285 |
| 5,572,555 | 11/1996 | Soenen et al. | 375/364 |
| 5,606,671 | 2/1997 | Wadsworth et al. | 395/286 |
| 5,611,055 | 3/1997 | Krishan et al. | 395/281 |
| 5,615,228 | 3/1997 | Soenen | 375/238 |
| 5,694,614 | 12/1997 | Bennett | 395/800 |

*Primary Examiner*—Thomas C. Lee
*Assistant Examiner*—Rehana Perveen
*Attorney, Agent, or Firm*—Casimer K. Salys; Antony P. Ng; Andrew J. Dillon

[57] ABSTRACT

An apparatus for improving I/O pin interfaces for serial data communications is disclosed. In accordance with a preferred embodiment of the present invention, an improved serial interface is provided, which comprises an oscillator input, a signal input, a counter, a register, and a data output. The counter is utilized to count the number of cycles of the oscillator input for which the signal input is asserted. The register is utilized to receive a value from the counter when the signal input is next de-asserted. The data output is at a first logical state when the signal input is asserted for fewer oscillation cycles than the value stored in the register and the data output is at a second logical state otherwise, such that only one I/O pin is required for serial communications.

13 Claims, 4 Drawing Sheets ical State

BACKGROUND OF THE INVENTION

1. Technical Field

The present invention relates to a method and apparatus for data processing in general, and in particular to a method and apparatus for improving data communications. Still more particularly, the present invention relates to a method and apparatus for improving low I/O pin count interfaces for serial data communications.

2. Description of the Prior Art

Typically, serial data communication is carried out between a transmitter and a receiver, in which data transfer is carried out by transmitting data sequentially one bit at a time. Thus, a data-processing system having only a parallel data bus must translate parallel data of 8, 16 or 32 bits into a serial data stream when outputting the data to a serial communication port. The translation is generally carried out by software or by means of a serial transfer circuitry.

Under the prior art, it is almost impossible for a data-processing system to arbitrarily set the bit length for serial data communications. As such, valuable time is wasted during serial data communications because the serial data stream includes necessary information together with unnecessary information. For example, where data to be transmitted is only 6 bits, data corresponding to 2 bits is unnecessarily transmitted when the bit length is at 8 bits. Thus, time is wasted in transmitting the extra two bits of unnecessary information.

Furthermore, one of the many design considerations for a device is the "pin count" of the device. The pin count is the number of connection pins that connect the device (or the chip within the package of the device) to a bus or other signal lines. A reduction in the device pin count, even by only one pin, can have a significant positive impact in minimizing the cost of the device. Consequently, it would be desirable to provide a better apparatus for improving I/O pin interface having a minimum pin count, for serial data communications.

SUMMARY OF THE INVENTION

In view of the foregoing, it is therefore an object of the present invention to provide an improved method and apparatus for data processing.

It is another object of the present invention to provide an improved method and apparatus for data communications.

It is yet another object of the present invention to provide an improved method and apparatus for improving low I/O pin count interfaces for serial data communications.

In accordance with a preferred embodiment of the present invention, an improved serial interface is provided, which comprises an oscillator input, a signal input, a counter, a register, and a data output. The counter is utilized to count the number of cycles of the oscillator input for which the signal input is asserted. The register is utilized to receive a value from the counter when the signal input is next de-asserted. The data output is at a first logical state when the signal input is asserted for fewer oscillation cycles than the value stored in the register and the data output is at a second logical state otherwise, such that only one I/O pin is required for serial communications.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be applicable to a variety of data-processing systems that require serial data communications. These data-processing systems include, for example, personal computers, midrange computers, and mainframe computers.

Figure 1:
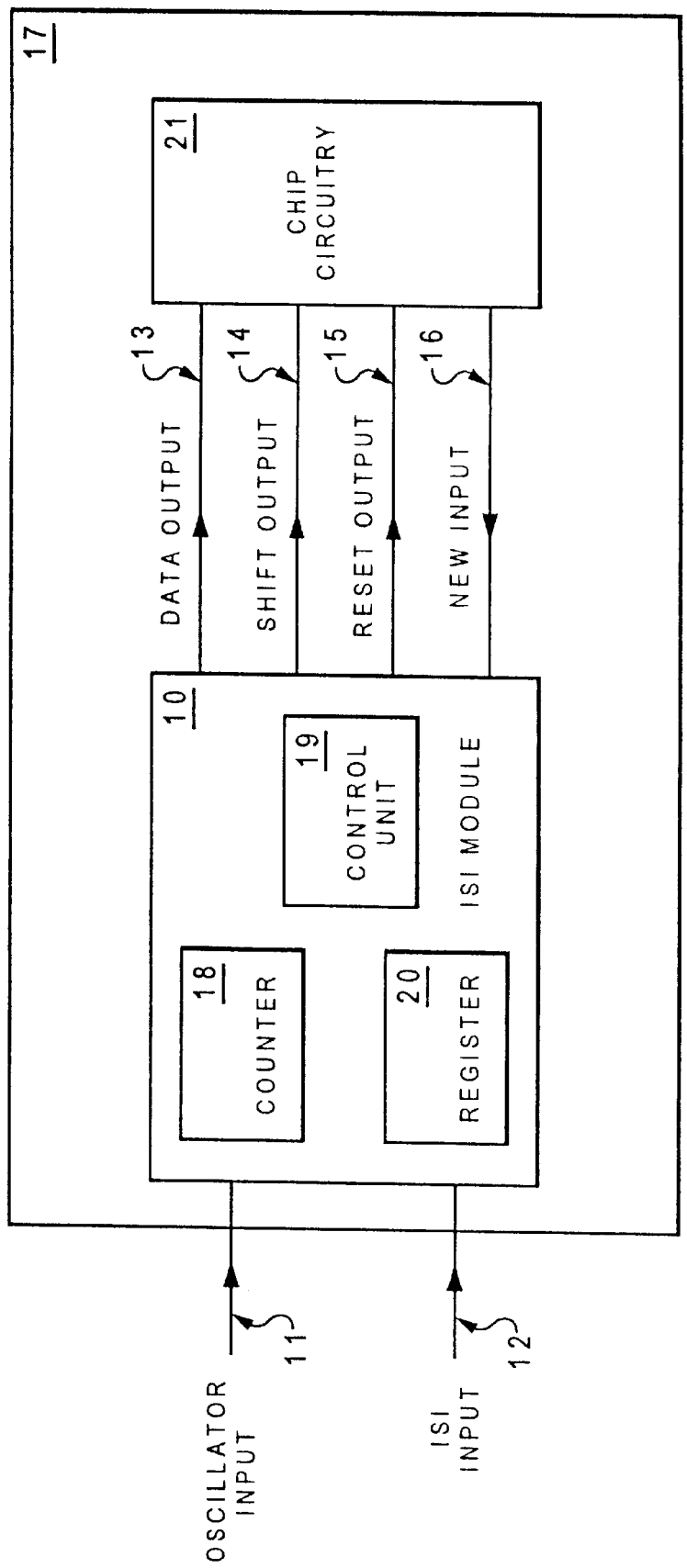
FIG. 1 is a block diagram of an improved serial interface (ISI) module for serial data communications, in accordance with a preferred embodiment of the present invention.

Referring now to the drawings and in particular to FIG. 1, there is depicted a block diagram of an improved serial interface (ISI) module for serial data communications, in accordance with a preferred embodiment of the present invention. As shown, ISI module 10 is an I/O pin interface utilized to transfer external decoded data to an internal chip circuitry 21, such as a shift register, within chip 17. Chip 17 may be a microprocessor, a microcontroller, or any other types of devices that require serial data communications, for data transfers, configuration, or initialization.

In a preferred embodiment of the present invention, an oscillator input 11 and an ISI input 12 are both required by chip 17 as signal inputs. DATA output 13, SHIFT output 14, and RESET output 15 are separately generated by ISI module 10 for internal usages by chip circuitry 21. In addition, a NEW input 16 may be optionally generated by chip circuitry 21 to be fed to ISI module 10 for signalling the end of one ISI transfer before starting another.

An ISI transfer is always begun by asserting and then de-asserting ISI input 12. A counter 18 is utilized to count up the number of oscillator cycles in which ISI input 12 is initially asserted. Counter 18 is also gated into a register 20 when ISI input pin 12 is next de-asserted. If an overflow occurs within counter 18, a RESET state is invoked via RESET output 15. RESET output 15 maintains this RESET state until ISI input 12 is asserted again for the initiation of a new ISI transfer.

If counter 18 does not overflow, an initial "1" bit is available at DATA output 13, as ISI input pin 12 is being de-asserted. This is a useful feature if all outputs of ISI module 10 is placed into a shift register within chip circuitry 21. The shift register can then be cleared by a RESET signal from RESET output 15, and the completion of the register load will be signalled by the initial "1" bit being shifted out at the end. This allows separate ISI transfers, of arbitrary length, to be accommodated easily by sending each ISI transfer into their respective shift registers within chip circuitry 21. The out-shifting of an initial "1" bit can be utilized to initiate a directing of data into a next shift register within chip circuitry 21, and it can also be utilized to feed into NEW input 16 for resetting ISI module 10 in order to prepare for another ISI transfer, at a different speed, if necessary.

Once an ISI transfer has begun, as described above, an arbitrary length sequence of data bits can be sent by additional assert/de-assert cycles at ISI input 12. If ISI input pin 12 is asserted for a shorter oscillation cycle than the value held in register 20, the data output will be decoded as a logical "0," otherwise, the data output will be decoded as a logical "1." DATA output 13 is valid only when SHIFT output 14 transitions from a de-asserted state to an asserted state, in the same way as the initial "1" bit. This occurs as ISI input 12 transitions from an asserted to a de-asserted state, and in fact, SHIFT output 14 can be derived directly from the inverse of ISI input 12.

STATE MACHINE FOR ISI OPERATIONS

Together with parallel loading counter 18 and register 20, a control unit 19 is arranged as a small state machine. A state diagram of this state machine for controlling the operations of ISI module 10, according to a preferred embodiment of the present invention, is depicted in Table I.

TABLE I

| STATE | ACTION | NEXT STATE |
|---|---|---|
| X | power up | 0 |
| 0 | reset; *shift; REG=000; CTR=*REG | ISI ⇒ 1 |
| 1 | *reset; if (*OSC → OSC), CTR++ | *ISI ⇒ 2 |
|   |   | (*MSB → MSB) ⇒ 0 |
| 2 | shift; REG=CTR | ISI ⇒ 3 |
| 3 | *shift; CTR=*REG | 4 |
| 4 | if (*OSC → OSC), CTR++ | *ISI ⇒ 5 |
|   |   | (*MSB → MSB) ⇒ 7 |
| 5 | shift | (*NEW & ISI) ⇒ 3 |
|   |   | (NEW & ISI) ⇒ 6 |
| 6 | *shift; REG=000; CTR=*REG | ISI ⇒ 1 |
| 7 | reset | *ISI ⇒ 0 |

ISI module 10 starts at state 0 after power up. In this state, register 20 (REG) is held cleared at "000" and counter 18 (CTR) is set according to an inverse of the value in register 20 (*REG), that is "111." RESET output 15 (reset) is at an asserted (i.e., active) level while SHIFT output 14 (shift) is at a de-asserted (i.e., inactive) level. As ISI input 12 is asserted, ISI module 10 enters state 1. RESET output 15 is de-asserted, and counter 18 (CTR) is arranged to be incremented once per cycle of oscillator input 11 (OSC). As ISI input 12 is next de-asserted, ISI module 10 enters state 2. The value reached by counter 18 is saved in register 20, for subsequent usage. When ISI input 12 is re-asserted once more, ISI module 10 enters state 3 and then state 4. During state 3, counter 18 is being loaded with an inverse of the value in register 20 (i.e., CTR=*REG). During state 4, oscillator input 11 is being gated to increment counter 18 again (i.e., CTR++), in the same way as in state 1. DATA output 13 is in fact the most significant bit (MSB) of counter 18 inverse, and SHIFT output 14 is the inverse of ISI input 12. When ISI input 12 is next de-asserted, the module enters state 5, causing SHIFT output 14 to be asserted. SHIFT output 14 may be connected to a shift register within chip circuitry 21, which also has its data input connected to DATA output 13. Thus, the state of DATA output line 13 is sampled into this shift register, by the active going edge of SHIFT output 14, as ISI input 12 is being de-asserted. The next time ISI input 12 is asserted, ISI module 10 enters state 3 again, and the process repeats, as described above.

After RESET, or at the start of a new ISI transfer, bits in counter 18 are set to all "1"s before waiting for the first assertion of ISI input 12. Then, at the subsequent oscillator cycle, counter 18 overflows to all "0"s. If ISI input 12 is held asserted, the MSB of counter 18 will eventually be transitioned from a "0" to a "1." In this case, a RESET state is entered, and RESET output 15 remains active until ISI input 12 is being de-asserted again.

If ISI input 12 is de-asserted before RESET output 15 becomes active, the value in counter 18 is gated into register 20, and SHIFT output 14 is asserted to allow chip circuitry 21 to sample the data bit from DATA output 13.

This is always a logical "1" because the MSB of counter 18 has transitioned from a "1" to a "0" at the first clock cycle after ISI input 12 was asserted, and counter 18 was first overflowed but has not yet overflowed again. Recall DATA output 13 is the inverse of the MSB of counter 18.

In sum, the first assertion time for ISI input 12 is basically measured as an oscillator cycle count, which is saved in register 20. For subsequent assertions of ISI input 12, counter 18 is first loaded with minus the value in register 20, and is then incremented. DATA output 13 is simply an inverse of the MSB of counter 18. Thus, if a subsequent ISI assertion time is less than or equal to the first assertion time, the inverse of the MSB of counter 18 will be decoded as a logical "0." However, if a subsequent ISI assertion time is greater than the first assertion time, the inverse of the MSB of counter 18 will be decoded as a logical "1."

If at any time during an ISI transfer, ISI input 12 is asserted for long enough, then a RESET state is entered and will persist until ISI input 12 is next de-asserted. The MSB of counter 18 will transition from a "1" to a "0" at one clock cycle after ISI input 12 is asserted, and will transition from "0" to "1" to enter a RESET state after $2^N$ more cycles, where N is the number of stages implemented in counter 18. This determines how long ISI input 12 must be held asserted to initiate a RESET state.

LOW-SPEED ISI OPERATIONS USING MICROCODE

Figure 2:
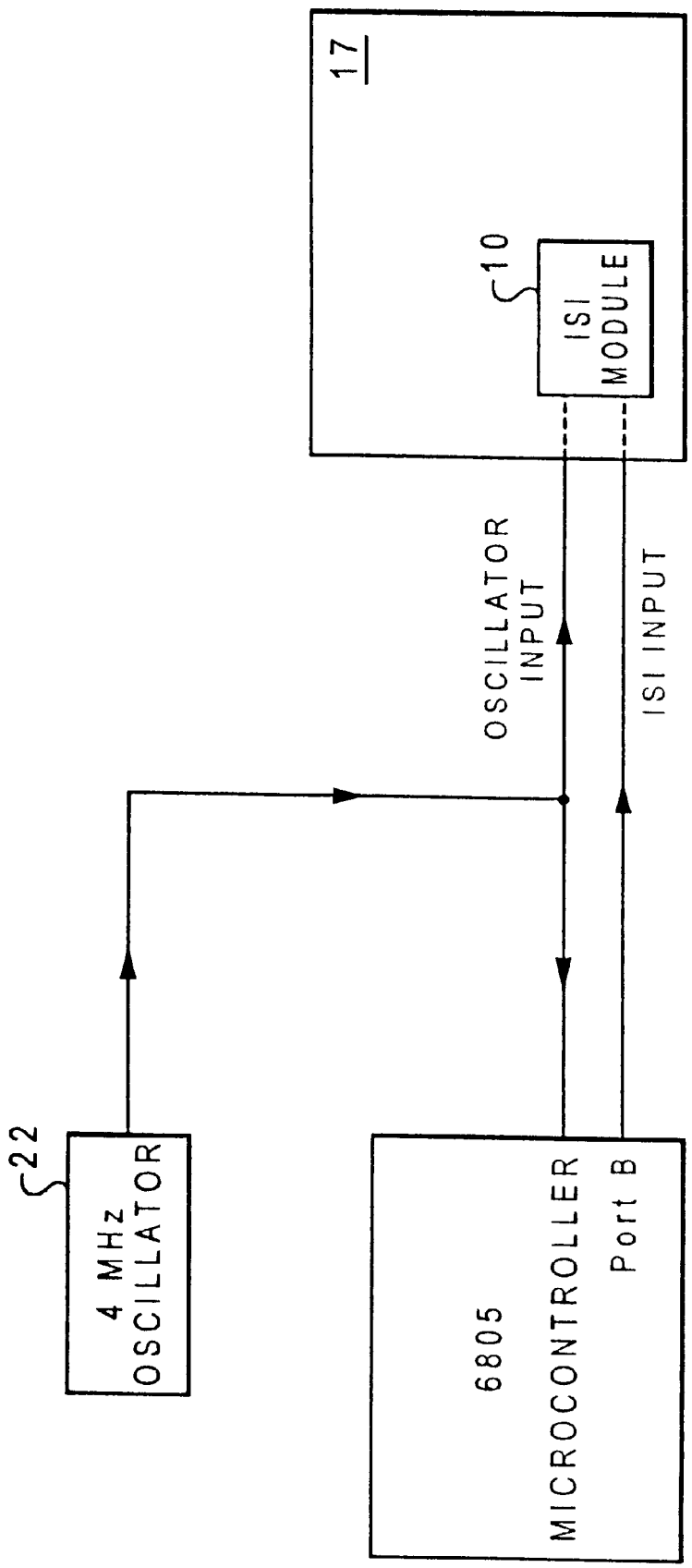
FIG. 2 is a block diagram illustrating an ISI module interfaced with a microcontroller, in accordance with a preferred embodiment of the present invention.

With reference now to FIG. 2, there is a block diagram illustrating an ISI module interfaced with a micro-controller, in accordance with a preferred embodiment of the present invention. For the purpose of illustration, ISI module 10 within chip 17 is shown to be coupled to a Motorola™ 6805 microcontroller. A 4 MHz oscillator 22 provides a common clock rate for both ISI module 10 and the microcontroller. Further, bit 5 of port B of the microcontroller is connected to an ISI input of ISI module 10. Data is assumed to be sent to an accumulator A within chip 17 on entry.

TABLE II

| start: | sec | ; (2) set carry |
|---|---|---|
|  | rora | ; (3) shift data bit to carry |
|  | bclr 5,portb | ; (5) assert PB5 (set negative) |
|  | nop | ; (2) additional delay |
|  | nop | ; (2) additional delay |
|  | bset 5,portb | ; (5) de-assert PB5 |
| lb1_01: | bclr 5,portb | ; (5) re-assert PB5 |
|  | bcc lb1_02 | ; (3) branch if carry clear |
|  | nop | ; (2) additional delay |
| lb1_02: | bset 5,portb | ; (5) de-assert PB5 |
|  | lsra | ; (3) next data bit to carry |
|  | bne lb1_01 | ; (3) branch back if not done |
| exit: | rts | ; (6) return to calling code |

A typical example of microcode listing for loading eight bits of data into chip 17 via ISI module 10 is depicted in Table II. The initial SET CARRY instruction and the following ROTATE RIGHT A instruction place the low-order data bit into the Carry, and also set a logical "1" to the high-order bit position of accumulator A. This is then utilized as a counter, as subsequent data are moved to the Carry utilizing a LOGICAL SHIFT RIGHT instruction, which brings a logical "0" into the high-order bit position of accumulator A. After each of these SHIFT operations, it is only necessary to test whether or not accumulator A equals to a logical "0," because this only occurs when all eight data bits originally in accumulator A have been sent.

The instruction cycle count for each instruction is shown in parenthesis within the comment section of Table II. The oscillator input to this particular microcontroller is divided by two in order to obtain internal cycle clocks. The routine as shown in Table II indicates the ISI input is initially asserted for 9 mpu cycles (or 18 oscillator cycles), then the ISI input is de-asserted for 5 mpu cycles (or 10 oscillator cycles). Then, the ISI input is again asserted for a total of 8 times, for either 8 mpu cycles (or 16 oscillator cycles) or 10 mpu cycles (or 20 oscillator cycles), in order to transmit data to ISI module 10, with an 11 mpu cycles (or 22 oscillator cycles) de-assertion time between each, then the ISI modules return to its calling code.

At a 4 MHz oscillation frequency, the code loop as shown in Table II may be able to transmit data at about a bit every 9 mpu cycles (or 18 oscillator cycles)+11 mpu cycles (or 22 oscillator cycles) on the average, which is equivalent to about 100 Kbits per second. Most certainly, a more powerful microcontroller or microprocessor can provide data transfer at a much higher rate. In fact, an even higher data transfer rate may be achieved if the ISI module is connected to a driver circuit operated by hardware. A transfer rate of about 100 Kbits per second, however, is an adequate speed for many tasks such as loading initial configuration data, for which the type of connection as shown in FIG. 2 would typically be utilized.

HIGH-SPEED ISI OPERATIONS USING HARDWARE

Figure 3:
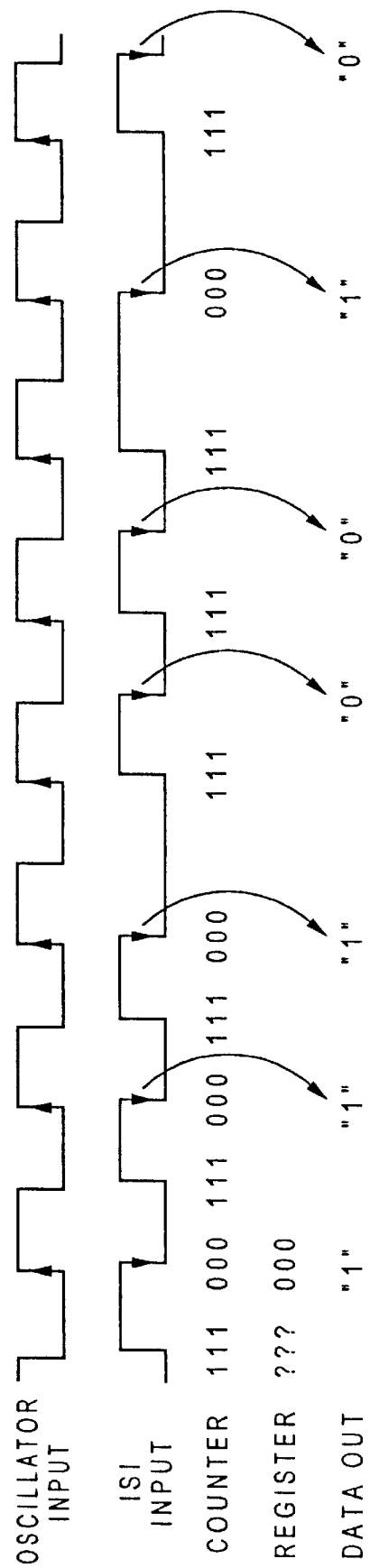
FIG. 3 is a timing diagram example depicting the operation of an ISI module, in accordance with a preferred embodiment of the present invention.

Referring now to FIG. 3, there is illustrated a timing diagram example depicting the operation of an ISI module, in accordance with a preferred embodiment of the present invention. As shown, a data transfer rate of approximately one bit per oscillator cycle can be sustained indefinitely for a continuous run of either "1" or "0" output. However, any transition at the output from either a "1" to a "0" or from a "0" to a "1" will take about 1.5 oscillator cycles.

Figure 4:
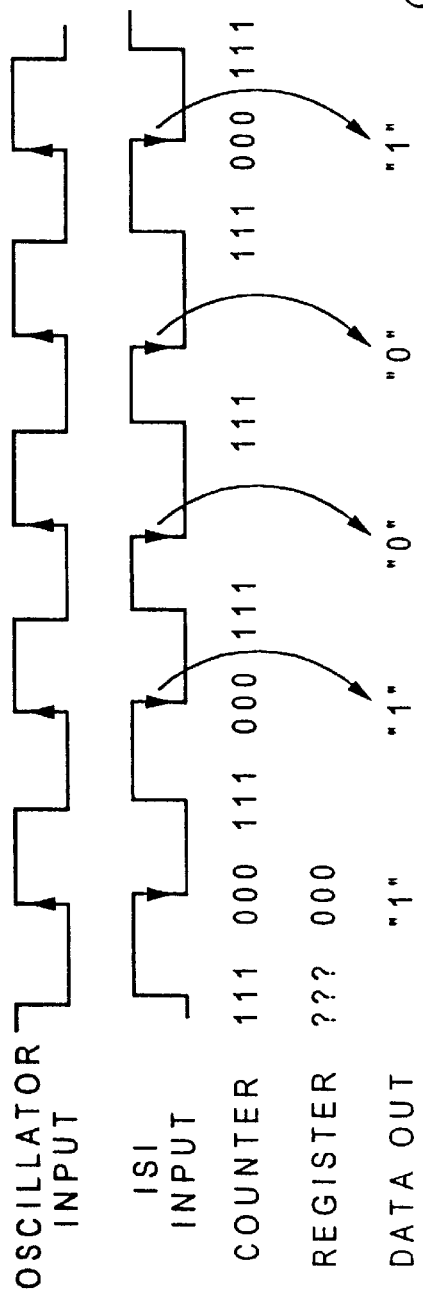
FIG. 4 is a timing diagram example illustrating ISI high-speed data transfers during which a driver circuit is utilized.

As a preferred embodiment of the present invention, the ISI module is positive assertion, and the counter is incremented at positive edges (indicated by up-arrows) of the oscillator input. Further, the edges (positive or negative) of the oscillator input are the only mechanism to be utilized by a driver hardware to initiate changes. If the drive hardware has access to higher frequencies than the oscillator input, a faster ISI operation such as the one shown in FIG. 4, can be utilized. As shown in FIG. 4, one data bit is always output for each oscillator cycle. In this case, because the ISI input may sometimes have to transition twice between the positive and negative edges of the oscillator input, hence a higher frequency for the driver hardware is needed.

Figure 5:
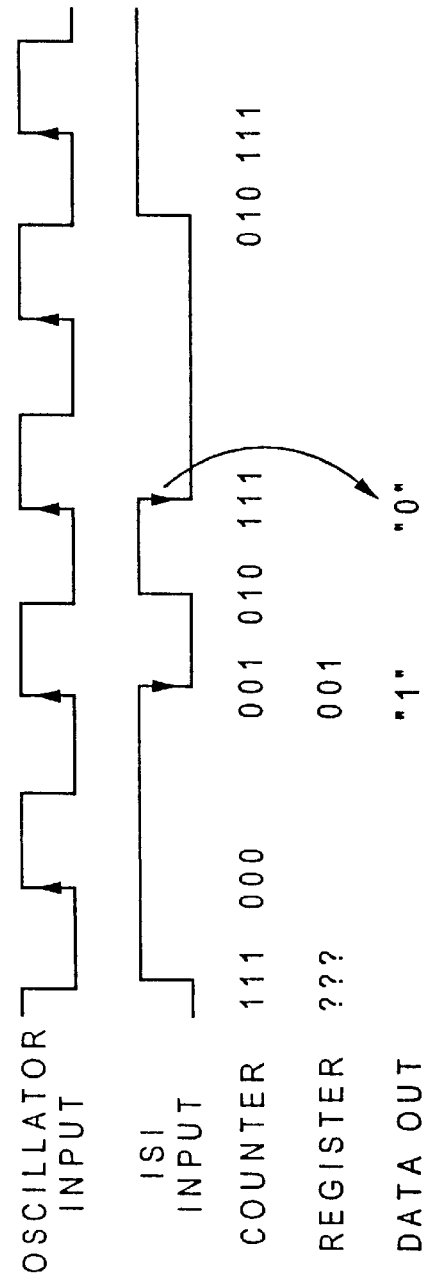
FIG. 5 is a timing diagram example illustrating ISI low-speed data transfers.

On the contrary, a slower data output speed can also be realized. FIG. 5, for example, depicts a data output rate of one bit for every two oscillator input cycles.

Note that the ISI modules are identical in both high speed (FIG. 4) and slow speed (FIG. 5) cases. The only difference is that the counter and the register are simply utilized to hold different values. Note also that each ISI transfer always begins with an output of an initial "1" bit as the value in the counter is loaded into the register. This value is then utilized as a reference, for subsequent decoding. Thus, it is possible to achieve ISI transfers at widely different speeds on the same ISI input.

COUNTER AND REGISTER SIZE

The number of bits implemented in the counter and the register determines the speed range of the ISI module. If only high speed hardware operation is envisaged, then only a few bits is required. To allow for a slower microcode loop operation, however, a higher number of bits, such as eight bits, is recommended. This allows for a maximum ISI initial assertion time of 127 oscillation cycles; data encoding then requires subsequent ISI assertion of 127 oscillation cycles or less for a logical "0" and 128 oscillation cycles or more for a logical "1." The speed range with an eight bit counter/register is thus from about 1 bit per oscillator cycle down to several hundred cycles per bit.

A 16- or 20-bit size counter/register permits a very broad ISI speed range, such as 100,000:1 or more. If a 20 MHz oscillator frequency is utilized, for example, this same ISI module can run up to a maximum speed of approximately 2.5 MBytes/second. And if a hardware driver circuit is also utilized, the same ISI module can run at speeds down to as slow as 25 or 50 Bytes/second, from a microcontroller port pin.

ASYNCHRONOUS OPERATION

The description so far has been limited to an identical oscillator signal shared by the microcontroller and the ISI module, which implies perfect synchronism. For less than absolute maximum speed, perfect synchronization is not required for the whole duration of the transfer process. Synchronization is only necessary for the duration for which the ISI input is asserted to be reliably less than the initial assertion time or greater. Independent asynchronous clocking could therefore be utilized for the microcontroller and the ISI module. Such a system may be operated by asserting the ISI input initially for about 10 oscillator cycles, and then followed by a nominal 5/15 oscillator cycles for a "0"/"1" data bit encoding. Provided the frequency stability or phasing of the independent clock oscillator utilized by the microcontroller and the ISI module does not cause the oscillator cycles counted by the ISI module to vary by more than +2 cycles, the ISI module will correctly decode the data.

As far as implementation is concerned, it is necessary to ensure that no marginal signal will ever be seen by the ISI module. This is a standard interfacing problem wherever an incoming signal is gated by a clock that is not synchronized to it. The gate may become active just as the signal is becoming inactive, resulting in a marginal logic signal at the output of the gate. Solutions for this are well known to those skilled in the art, and will not be detailed here. Generally, the gated incoming signal is set to a latch first, and is utilized at a subsequent clock edge, to ensure the latch has reliably set to a valid logic level.

The result of this is that the incoming ISI transitions are delayed by a short amount of perhaps one half of an oscillator cycle, and are of course quantized to exact numbers of oscillator cycles. This has no effect on the speed, other than the short initial delay introduced.

As has been described, the present invention provides a better method for improving I/O pin interface for serial data communication. Under the present invention, an improved serial interface module is described. This improved serial interface module is utilized for applications where data or personality information must be loaded into a chip such as a microcontroller, microprocessor, or other similar types of devices.

The improved serial interface module, as described, utilizes only a single I/O pin, and needs only a modest amount of chip area to implement. It can provide a RESET function, as well as serial data communications capability covering a very wide range of speed to the chip. This permits initial configuration or personality data loading and even control message transfers, by utilizing simple microcode control of one I/O port pin to send such data.

The improved serial interface module is thus useful for chip-to-chip communications in a data-processing system, or for providing off-chip I/O expansion capability. This allows chips to be packaged in a cheaper, lower I/O pin count package, more suitable for mass market, high volume applications.

Furthermore, multiple serial interface modules can also be readily implemented on a chip, to permit higher data rates. Other applications of this ISI module include personality load and microcode load for autonomous digital signal processors or microprocessors/microcontrollers with volatile on-chip control stores and other kinds of tables that must be set up initially before operation.

It is understood by those skilled in the art that the ISI module, as described, may be incorporated in a typical computer system for facilitating serial data communications. Such typical computer system may include at least a processor and a system memory, in which serial data communications may be conducted via a serial port or other similar types of communication devices.

While the invention has been particularly shown and described with reference to a preferred embodiment, it will be understood by those skilled in the art that various changes in form and detail may be made therein without departing from the spirit and scope of the invention.

What is claimed is:

1. An improved serial interface for facilitating serial data communications, said improved serial interface comprising:
    an oscillator input;
    an assertable signal input;
    a counter for counting a number of cycles of said oscillator input for which said signal input is asserted;
    a register for receiving a value from said counter when said signal input is next de-asserted; and
    a data output, wherein said data output outputs a first logical state when said signal input is asserted for fewer oscillation cycles than said value stored in said register and said data output outputs a second logical state otherwise.

2. The improved serial interface according to claim 1, wherein said first logical state is a logical "0" and said second logical state is a logical "1."

3. The improved serial interface according to claim 1, wherein said counter is a parallel loading counter.

4. The improved serial interface according to claim 1, wherein said improved serial interface further includes a shift output, wherein said data output of said improved serial interface is valid only when shift output is asserted.

5. The improved serial interface according to claim 1, wherein a value of said counter is gated into said register when said signal input is next de-asserted.

6. A data-processing system capable of providing serial data communications, wherein said data-processing includes an oscillator input and an assertable signal input, said data-processing system comprising:
    a processor; and
    an improved serial interface, wherein said improved serial interface includes:
        a counter for counting a number of cycles of said oscillator input for which said signal input is asserted;
        a register for receiving a value from said counter when said signal input is next de-asserted; and
        a data output, wherein said data output is at a first logical state when said signal input is asserted for fewer oscillation cycles than said value stored in said register and said data output is at a second logical state otherwise.

7. The data-processing system according to claim 6, wherein said first logical state is a logical "0" and said second logical state is a logical "1."

8. The data-processing system according to claim 6, wherein said counter is a parallel loading counter.

9. The data-processing system according to claim 6, wherein said improved serial interface further includes a shift output, wherein said data output is valid only when shift output is asserted.

10. The data-processing system according to claim 6, wherein a value of said counter is gated into said register when said signal input is next de-asserted.

11. A method for facilitating serial data communications in a data-processing system, wherein said data-processing system includes an oscillator input and an assertable signal input, said method comprising the steps of:
    counting a number of cycles of said oscillator input for which said signal input is asserted;
    receiving a value from said counter when said signal input is next de-asserted; and
    yielding a first logical state when said signal input is asserted for fewer oscillation cycles than said value stored in said register and yielding a second logical state otherwise.

12. The method according to claim 11, wherein said first logical state is a logical "0" and said second logical state is a logical "1."

13. The method according to claim 11, wherein said method further includes a step of gating a value of said counter into said register when said signal input is next de-asserted.

* * * * *